US011327216B2

(12) United States Patent
Ikeda et al.

(10) Patent No.: US 11,327,216 B2
(45) Date of Patent: May 10, 2022

(54) DISPLAY DEVICE INCLUDING A PROTECTIVE LAYER HAVING A DIFFUSION LAYER AND GAMING MACHINE HAVING THE SAME

(71) Applicant: OMRON Corporation, Kyoto (JP)

(72) Inventors: Shogo Ikeda, Ichinomiya (JP); Junya Fujita, Ichinomiya (JP); Masanori Mori, Ichinomiya (JP); Mitsuru Okuda, Ichinomiya (JP); Takuma Ikeda, Ichinomiya (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/070,967

(22) Filed: Oct. 15, 2020

(65) Prior Publication Data

US 2021/0149103 A1 May 20, 2021

(30) Foreign Application Priority Data

Nov. 15, 2019 (JP) ............................ JP2019-207432

(51) Int. Cl.
*F21V 8/00* (2006.01)
*A63F 13/25* (2014.01)

(52) U.S. Cl.
CPC .............. *G02B 6/005* (2013.01); *A63F 13/25* (2014.09); *G02B 6/0036* (2013.01); *G02B 6/0051* (2013.01)

(58) Field of Classification Search
CPC .............. A63F 13/90; A63F 2009/0625; A63F 2009/063; G02B 6/0036; G02B 6/005; G02B 6/0051; G02B 6/0055
See application file for complete search history.

(56) References Cited

U.S. PATENT DOCUMENTS

2013/0335945 A1* 12/2013 Okuda ................ F21V 33/0052 362/23.06
2016/0306098 A1 10/2016 Fujita et al.
2017/0285245 A1* 10/2017 Fujita .................. G02B 6/0036
2018/0182201 A1* 6/2018 Fujita ..................... H05B 45/00
2021/0003766 A1* 1/2021 Rinko .................. G02B 6/0035
2021/0215857 A1* 7/2021 Nichol ................. G02B 6/0031

FOREIGN PATENT DOCUMENTS

JP 2016-206240 A 12/2016

* cited by examiner

*Primary Examiner* — Keith G. Delahoussaye
(74) *Attorney, Agent, or Firm* — Metrolex IP Law Group, PLLC

(57) ABSTRACT

A display device according to one or more embodiments may include a lightguide plate comprising a transparent part, and an incident surface, the lightguide plate configured to display at least one pattern; and a light source facing the incident surface. The lightguide plate may include a plurality of prisms on a surface of the lightguide plate, the plurality of prisms being arranged along the at least one pattern to reflect light emitted from the light source and entering the lightguide plate through the incident surface out of the lightguide plate through an emission surface of the light-guide plate, and a transparent protective layer covering at least a part of the emission surface, the protective layer having a smaller refractive index than the lightguide plate.

2 Claims, 9 Drawing Sheets

2c 23 22 700 2 11 11 21 2a 3

DISPLAY DEVICE INCLUDING A PROTECTIVE LAYER HAVING A DIFFUSION LAYER AND GAMING MACHINE HAVING THE SAME

CROSS-REFERENCE TO RELATED APPLICATION

This application claims the benefit of priority to Japanese Patent Application No. 2019-207432 filed on Nov. 15, 2019, the entire contents of which are incorporated herein by reference.

BACKGROUND

The disclosure relates to a display device for displaying patterns using a lightguide plate and to a gaming machine including the display device.

A known display device may include multiple prisms in a lightguide plate along a predetermined pattern and reflects, with the prisms, light from a light source propagating within the lightguide plate toward a viewer (refer to, for example, Japanese Unexamined Patent Application Publication No. 2016-206240 (hereinafter referred to as Patent Literature 1)) to display the predetermined pattern.

SUMMARY

With the technique described in Patent Literature 1, light propagates within the lightguide plate while being totally reflected. Any flaw or dirt on a surface of the lightguide plate may scatter or reflect such light propagating within the lightguide plate out of the lightguide plate, causing the flaw or dirt, in addition to the pattern to be displayed, to appear glowing for the viewer.

One or more embodiments are directed to a display device that may reduce glowing of areas other than a pattern to be displayed.

A display device according to one or more embodiments may include a lightguide plate comprising a transparent part, and an incident surface, the lightguide plate configured to display at least one pattern; and a light source facing the incident surface. The lightguide plate may include a plurality of prisms on a surface of the lightguide plate, the plurality of prisms being arranged along the at least one pattern to reflect light emitted from the light source and entering the lightguide plate through the incident surface out of the lightguide plate through an emission surface of the lightguide plate, and a transparent protective layer covering at least a part of the emission surface, the protective layer having a smaller refractive index than the lightguide plate. The display device with the above structure can reduce glowing of areas other than the pattern to be displayed.

In the display device, the protective layer may include a diffusion layer shaped similarly to the at least one pattern and overlapping the at least one pattern as viewed in a direction normal to the emission surface. The diffusion layer may diffuse light emitted through the emission surface.

The display device with the above structure can reduce glowing of areas other than the pattern to be displayed and widens the viewable range of the pattern.

A gaming machine according to another of the one or more embodiments may include a body, and a display device on a surface of the body to face a player. In the gaming machine, the display device may include a lightguide plate comprising a transparent part and an incident surface to display at least one pattern, and a light source facing the incident surface. The lightguide plate may include a plurality of prisms on a surface of the lightguide plate and arranged along the at least one pattern to reflect light emitted from the light source and entering the lightguide plate through the incident surface out of the lightguide plate through an emission surface of the lightguide plate to face a player, and a transparent protective layer covering at least a part of the emission surface and having a smaller refractive index than the lightguide plate.

The gaming machine with the above structure can reduce glowing of areas other than the pattern to be displayed in the display device.

DETAILED DESCRIPTION

A display device according to one or more embodiments will now be described with reference to the drawings. The display device may include a lightguide plate formed from a material transparent to light emitted from a light source. The lightguide plate has one surface serving as an emission surface facing a viewer. The lightguide plate may also have one of the side surfaces thereof surrounding the emission surface serving as an incident surface facing the light source. The lightguide plate may include, on the other surface opposite to the emission surface, multiple prisms that reflect light emitted from the light source and entering the lightguide plate toward the emission surface. The prisms may be arranged along at least one pattern to be displayed by the display device. The display device may include a transparent protective layer covering at least a part of the emission surface of the lightguide plate. The protective layer has a smaller refractive index than the lightguide plate. For the protective layer with any dirt or flow, light propagating within the lightguide plate is totally reflected on the emission surface of the lightguide plate, without reaching the flaw or dirt. In other words, the display device reduces glowing of areas other than the pattern to be displayed.

In the examples described below, for ease of explanation, the term front refers to a direction toward the viewer and the term back refers to the opposite direction.

Figure 1:
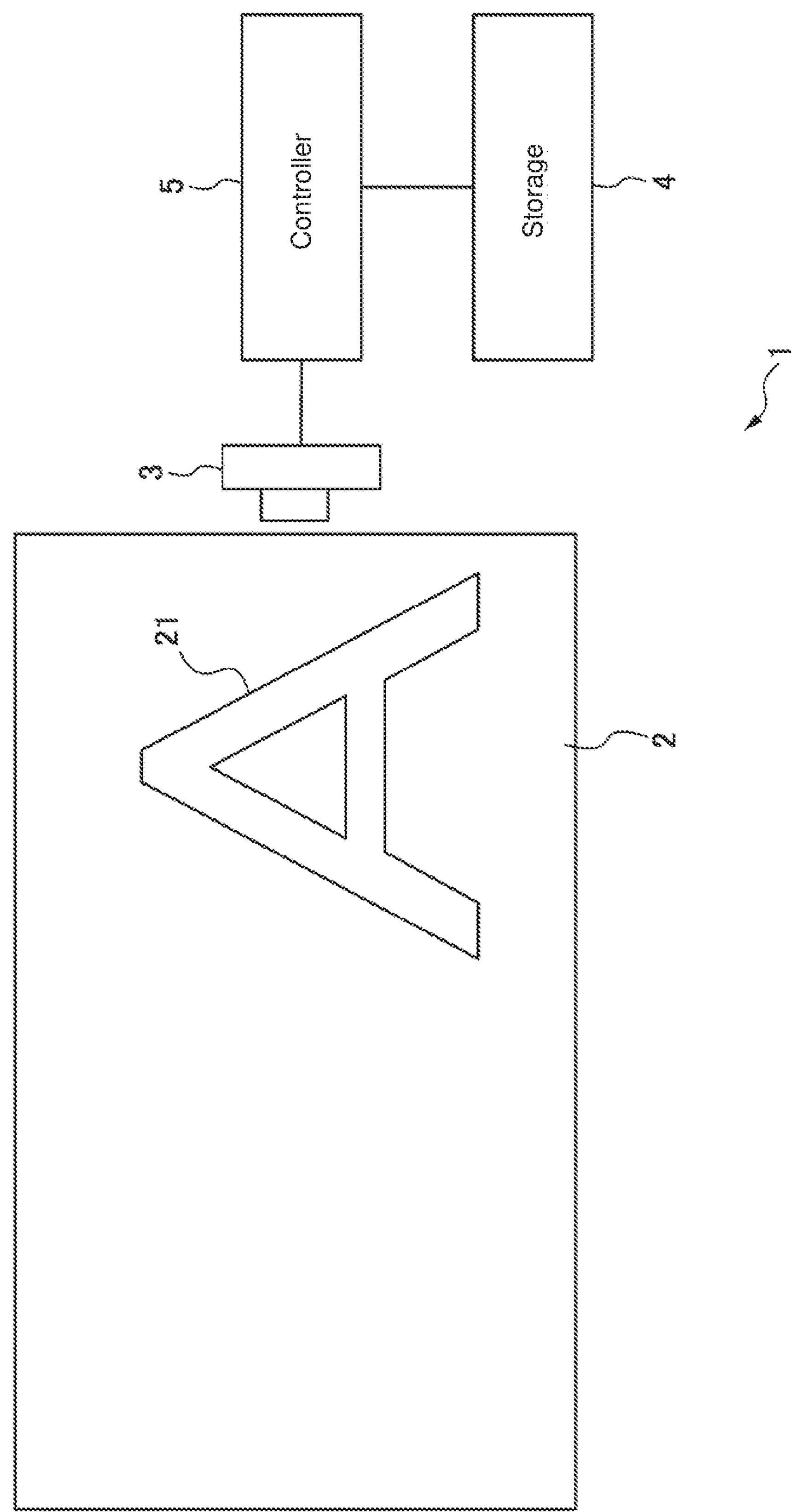
FIG. 1 is a schematic diagram illustrating a display device according to one or more embodiments.

FIG. 1 is a schematic diagram of a display device according to one embodiments. A display device 1 may include a lightguide plate 2, a light source 3, a storage 4, and a controller 5.

The lightguide plate 2 may be transparent to light emitted from the light source 3. The lightguide plate 2 may be a molded plate formed from, for example, a resin transparent to visible light, such as polymethyl methacrylate (PMMA), polycarbonate, or a cyclic olefin polymer. The lightguide plate 2 may include at least one pattern to be displayed in response to the light source 3 being turned on. Although the lightguide plate 2 may include one pattern 21 in the present embodiment, the lightguide plate 2 may include multiple patterns. While the light source 3 is on, the lightguide plate 2 allows light from the light source 3 to propagate within the lightguide plate 2 and reflects the light toward the viewer in front of the lightguide plate 2 with multiple prisms (described in detail later) arranged on the back surface to form the pattern 21. This arrangement allows the viewer to view the pattern 21 glowing.

The lightguide plate 2 will be described in detail later.

The light source 3 may include at least one light emitter that emits visible light. In the present embodiment, the light source 3 faces one side surface of the lightguide plate 2, which serves as an incident surface 2*a*. For the light source 3 including multiple light emitters, the light emitters may be arranged in a row in the longitudinal direction of the incident surface 2*a*. The light source 3 including multiple light emitters arranged in the longitudinal direction of the incident surface 2*a* widens the viewing range of the viewer to view the pattern 21. A collimator lens may be located between the light emitters in the light source 3 and the incident surface 2*a* to collimate light emitted from each light emitter.

While the light source 3 is on, as being controlled by the controller 5, light emitted from the light source 3 enters the lightguide plate 2 through the incident surface 2*a*. The light propagates within the lightguide plate 2 and is then reflected on the multiple prisms arranged on the back surface 2*b* of the lightguide plate 2 to form the pattern 21. The reflected light is then emitted through an emission surface 2*c* at the front.

The light emitters in the light source 3 are, for example, light-emitting diodes.

The storage 4 may include, for example, a volatile or nonvolatile memory circuit. The storage 4 stores information such as light control information indicating the timing at which the light source 3 is turned on and off.

The controller 5 may include, for example, a processor and a drive circuit for driving the light source 3. The controller 5 turns on and off the light source 3 in accordance with the light control information.

The controller 5 turns on the light source 3 to cause the pattern 21 at the front of the lightguide plate 2 to be viewable to the viewer adjacent to the emission surface of the lightguide plate 2. The controller 5 turns off the light source 3 to cause the pattern 21 to be unviewable to the viewer.

The light control information determines the timing at which the light source 3 is turned on and off. More specifically, the controller 5 turns on the light source 3 to display the pattern 21 at the turning-on timing indicated by the light control information. In contrast, the controller 5 turns off the light source 3 to cause the pattern 21 to be unviewable at the turning-off timing indicated by the light control information. When the light source 3 is to be constantly on, the controller 5 may cause each light source to be constantly on without referring to the light control information during the operation of the display device 1.

The lightguide plate 2 will now be described in detail.

Figure 2:
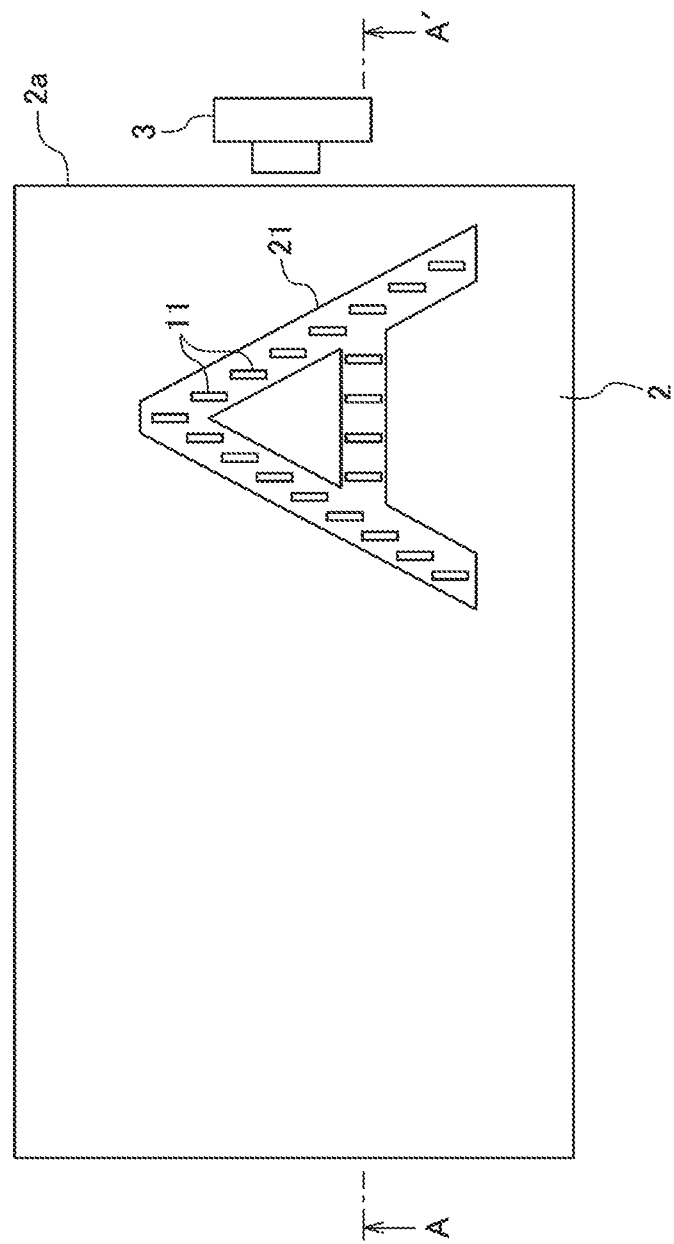
FIG. 2 is a diagram illustrating schematic front view of a lightguide plate included in the display device.
Figure 3:
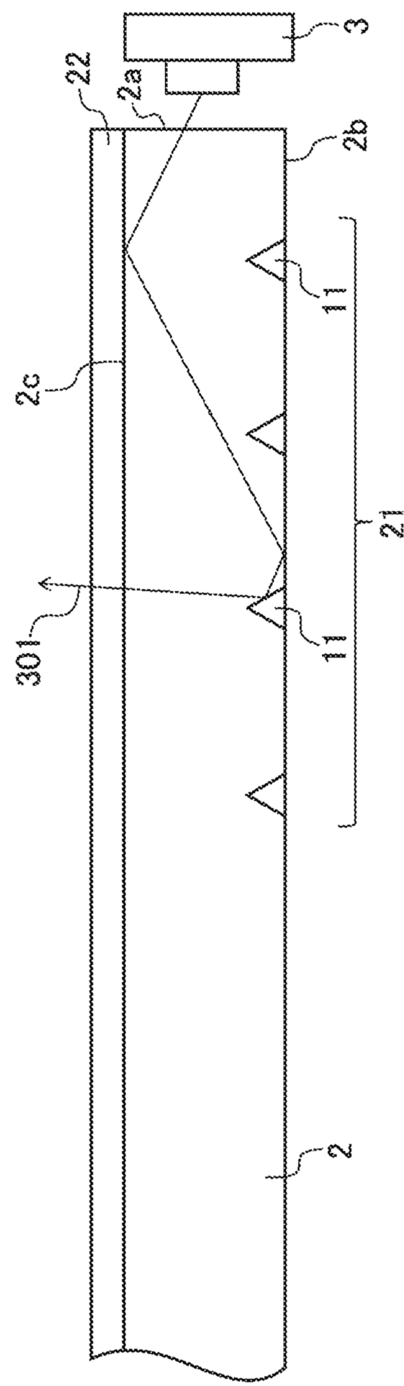
FIG. 3 is a diagram illustrating a schematic cross-sectional side view of the lightguide plate taken along a line indicated by arrows AA' in FIG. 2.

FIG. 2 is a schematic front view of the lightguide plate 2. FIG. 3 is a schematic cross-sectional side view of the lightguide plate 2 taken along a line indicated by arrows AA' in FIG. 2. As shown in FIGS. 2 and 3, one side surface of the lightguide plate 2 serves as the incident surface 2*a* facing the light source 3. As indicated by a light beam 301, light emitted from the light source 3 enters the lightguide plate 2 through the incident surface 2*a*. The light from the light source 3 entering the lightguide plate 2 is totally reflected on a back surface 2*b* of the lightguide plate 2 and the emission surface 2*c* located at the front of the lightguide plate 2 and opposite to the back surface 2*b* to propagate within the lightguide plate 2. The light from the light source 3 propagating within the lightguide plate 2 is then totally reflected on each of multiple prisms 11 arranged along the pattern 21 on the back surface 2*b* of the lightguide plate 2. The reflected light is then emitted through the emission surface 2*c* of the lightguide plate 2.

The prisms 11 may be arranged along the pattern 21 to form the pattern 21. The pattern 21 appears glowing for the viewer while the light source 3 is on. In FIGS. 2 and 3, the sizes of the prisms and the thickness of the lightguide plate 2 are exaggerated for ease of illustration.

Figure 4B:
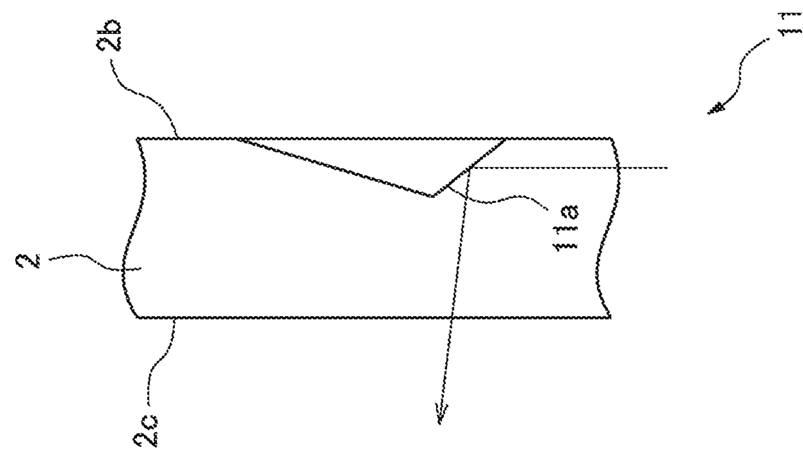
FIG. 4B is a diagram illustrating a schematic side view of the prism.
Figure 4A:
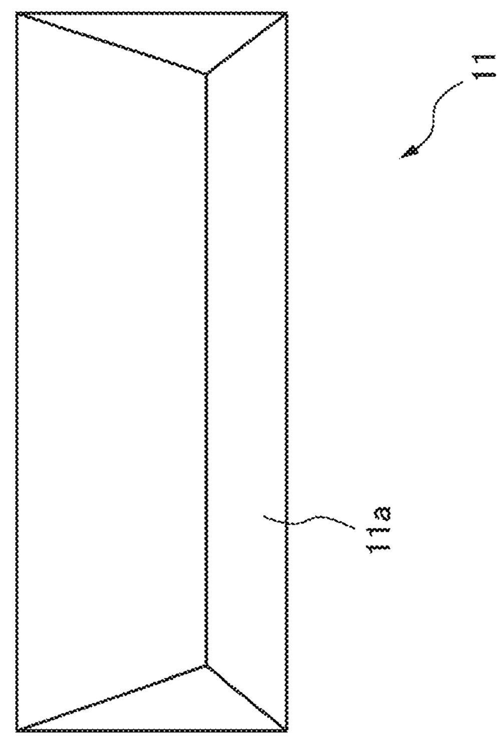
FIG. 4A is a diagram illustrating a schematic front view of a prism on the lightguide plate.

FIG. 4A is a schematic front view of the prism 11 on the lightguide plate 2. FIG. 4B is a schematic side view of the prism 11. The prism 11 may be a triangular groove having a predetermined length on the back surface 2*b* of the lightguide plate 2. One of the two slopes of the prism 11 serves as a reflection surface 11*a* that reflects light from the light source 3 toward the emission surface 2*c*. For example, the reflection surface 11*a* may be angled to totally reflect the light entering the lightguide plate 2 from the light source 3 toward the emission surface 2*c*, and may be angled at, for example, 40° to 50° relative to the back surface 2*b*.

The predetermined length may be set to allow the pattern 21 to include the multiple prisms 11 and may be set to, for example, about several hundreds of micrometers to several millimeters.

Referring back to FIG. 3, in the present embodiment, the emission surface 2*c* may be covered with a protective layer 22 that may be in close contact with the lightguide plate 2 on the emission surface 2*c*. The protective layer 22 has a smaller refractive index than the lightguide plate 2. The protective layer 22 may be formed from a material transparent to light emitted from the light source 3. The protective layer 22 may be formed from an optical resin coating material, such as an acrylic material or a silicon material applied on the emission surface 2*c* of the lightguide plate 2, or formed from such a material by an in-mold process. The protective layer 22 reduces glowing of areas caused by any flaw or dirt on the lightguide plate 2 other than the pattern 21. The protective layer 22 may entirely or partially cover the emission surface 2*c*. For example, the protective layer 22 may simply cover an area surrounding the pattern 21 or an area along a propagation path of light within the lightguide plate 2 from the light source 3 to the pattern 21.

Figure 5A:
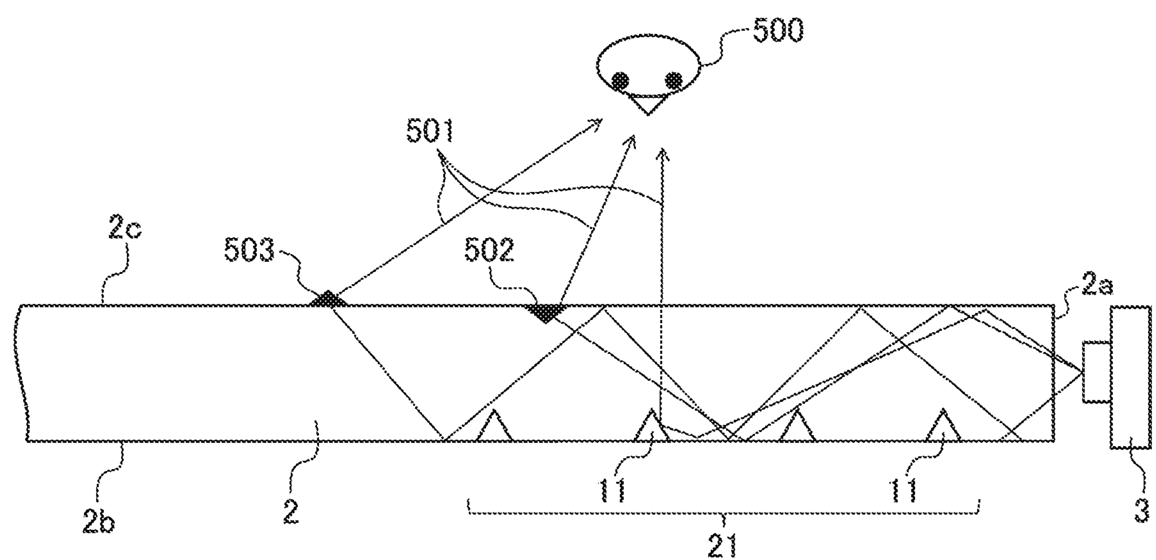
FIG. 5A is a diagram illustrating light propagation within a lightguide plate with a flaw or dirt in a comparative example in which the lightguide plate eliminates a protective layer on its emission surface.
Figure 5B:
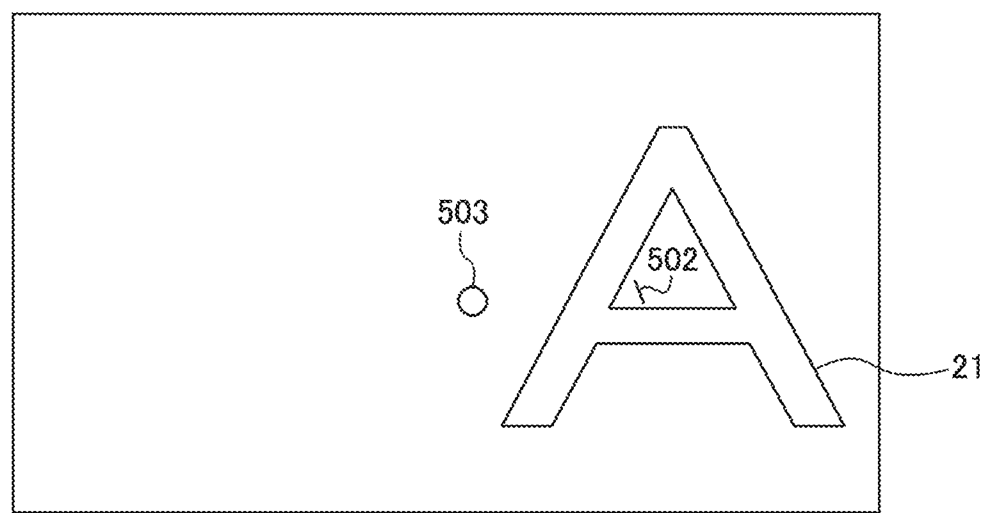
FIG. 5B is a diagram illustrating a schematic front view of the lightguide plate in the comparative example shown in FIG. 5A for displaying patterns or other objects for viewing.

FIG. 5A is a diagram describing light propagation within the lightguide plate with a flaw or dirt in a comparative example in which the light guide plate 2 eliminate protective layer 22 on the emission surface 2*c*. FIG. 5B is a schematic front view of the lightguide plate 2 in the comparative example shown in FIG. 5A for displaying patterns or other objects for viewing.

In FIG. 5A, multiple lines 501 represent light beams from the light source 3. In the comparative example, light including the light beams 501 emitted from the light source 3 enters the lightguide plate 2 through the incident surface 2*a* of the lightguide plate 2 and may be totally reflected on the back surface 2*b* and the emission surface 2*c* to propagate within the lightguide plate 2. When the light is reflected on the reflection surfaces of the multiple prisms 11 arranged along the pattern 21, the reflected light enters the emission surface 2*c* at a smaller angle. This arrangement causes the light reflected on the prism 11 to be emitted through the emission surface 2*c* toward a viewer 500 facing the front of the lightguide plate 2, instead of being totally reflected on the emission surface 2*c*. When light propagating within the lightguide plate 2 reaches a flaw 502 or dirt 503 on the emission surface 2*c*, the light may be reflected or scattered by the flaw 502 or dirt 503 and may be emitted out of the lightguide plate 2, possibly toward the viewer 500. As shown in FIG. 5B, the flaw 502 and the dirt 503, in addition to the pattern 21, may appear glowing for the viewer.

Figure 6A:
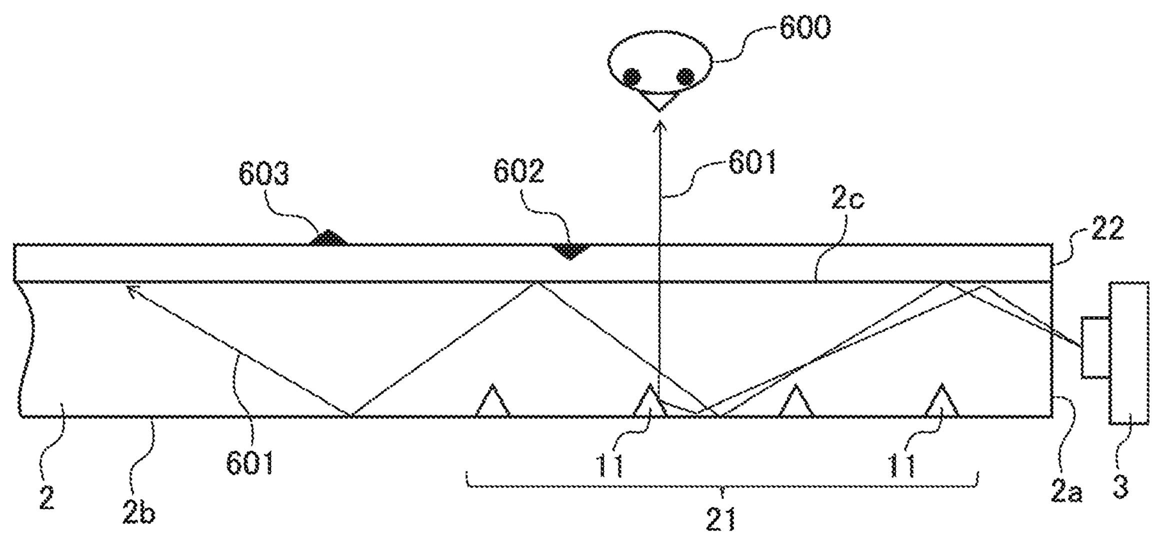
FIG. 6A is a diagram illustrating light propagation within a lightguide plate when a flaw or dirt is on a protective layer in the display device according to the embodiment.
Figure 6B:
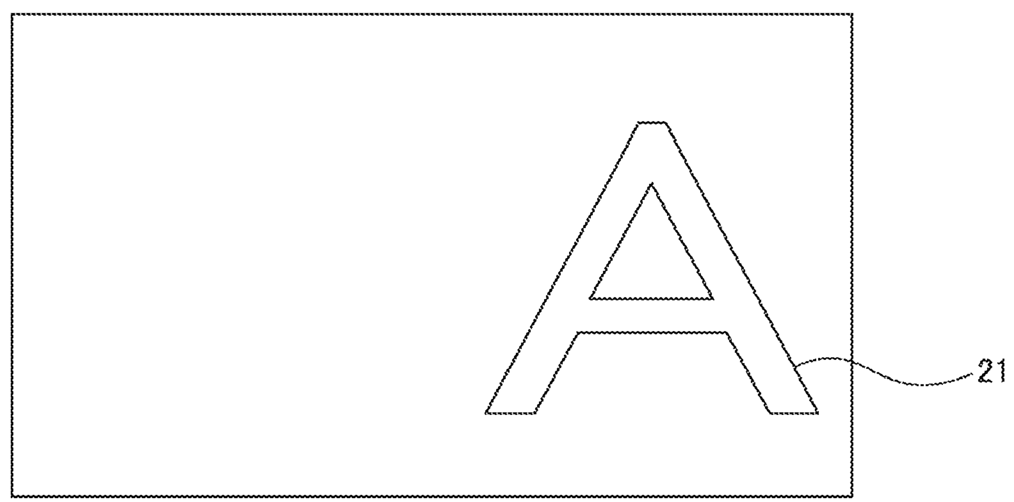
FIG. 6B is a diagram illustrating a schematic front view of the lightguide plate with a pattern for viewing when a flaw or dirt is on the protective layer.

FIG. 6A is a diagram describing light propagation within the lightguide plate 2 when a flaw or dirt is on the protective layer 22 in the display device 1 according to the present embodiment. FIG. 6B is a schematic front view of the lightguide plate 2 displaying a pattern for viewing when a flaw or dirt is on the protective layer 22.

In FIG. 6A, multiple lines 601 represent light beams from the light source 3. In the present embodiment, light including the light beams 601 emitted from the light source 3 enters the lightguide plate 2 through the incident surface 2*a* of the lightguide plate 2 and may be totally reflected on the back surface 2*b* and the emission surface 2*c* of the lightguide plate 2 to propagate within the lightguide plate 2. When the light is reflected on the reflection surfaces of the multiple prisms 11 arranged along the pattern 21, the reflected light enters the emission surface 2*c* at a smaller angle. This arrangement causes the light reflected on the prism 11 to be emitted through the emission surface 2*c* and then through the protective layer 22 toward a viewer 600 facing the front of the lightguide plate 2, instead of being totally reflected on the emission surface 2*c*.

The protective layer 22 has a smaller refractive index than the lightguide plate 2 in the present embodiment. This arrangement causes the light propagating within the lightguide plate 2 to be totally reflected on the emission surface 2*c*, which is an interface between the lightguide plate 2 and the protective layer 22, preventing the light from entering the protective layer 22. For the protective layer 22 with a flaw 602 or dirt 603, light propagating within the lightguide plate 2 avoids reaching the flaw 602 or dirt 603 and thus avoids being emitted through the flaw 602 or dirt 603 out of the lightguide plate 2. As shown in FIG. 6B, the pattern 21 appears glowing for the viewer, and the flaw 602 and the dirt 603 remain unviewable to the viewer.

As described above, the display device may include multiple prisms arranged along a pattern to be displayed on the lightguide plate and displays the pattern with reflected light emitted from a light source and entering the lightguide plate with the multiple prisms toward the front. The display device may include the protective layer on the emission surface at the front of the lightguide plate, and the protective layer has a smaller refractive index than the lightguide plate. This arrangement causes the light entering the lightguide plate from the light source to be totally reflected on the emission surface, which is an interface between the protective layer and the lightguide plate, and then to propagate within the lightguide plate. In other words, the light propagating within the lightguide plate does not enter the protective layer. For the protective layer with any flaw or dirt, light propagating within the lightguide plate avoids being emitted through the flaw or the dirt out of the lightguide plate due. The display device thus reduces glowing of the flaw or dirt. In other words, the display device reduces glowing of areas other than the pattern to be displayed.

In one modification, a diffusion layer may be located in a part of a protective layer to diffuse light entering the protective layer.

Figure 7A:
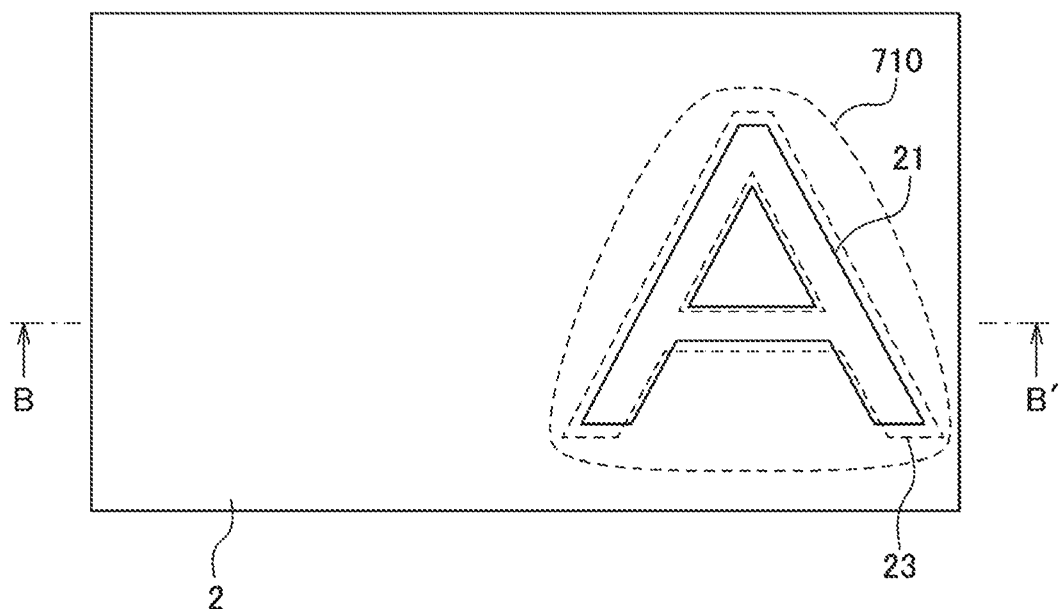
FIG. 7A is a diagram illustrating a schematic front view of a lightguide plate including a diffusion layer in a protective layer according to a modification, showing the location of the diffusion layer.
Figure 7B:
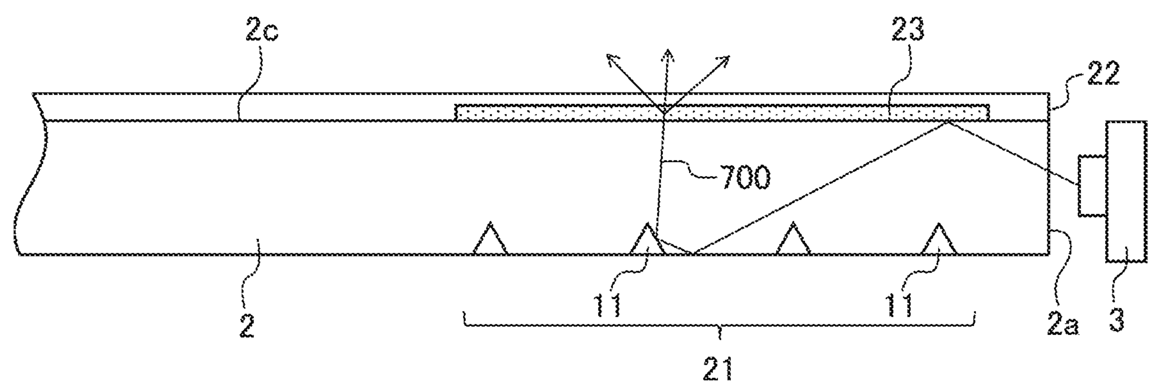
FIG. 7B is a schematic cross-sectional side view of the lightguide plate taken along a line indicated by arrows BB' in FIG. 7A.

FIG. 7A is a schematic front view of a lightguide plate including the diffusion layer in the protective layer according to the modification, showing the location of the diffusion layer. FIG. 7B is a schematic cross-sectional side view of the lightguide plate taken along a line indicated by arrows BB' in FIG. 7A.

As shown in FIG. 7A, in the present example, a diffusion layer 23 shaped similarly to the pattern 21 on the lightguide plate 2 may be located in the protective layer 22 to overlap the pattern 21 as viewed in the direction normal to the emission surface 2*c*. The diffusion layer 23 may be formed from a light-diffusive material such as a resin that can diffuse incident light. The diffusion layer 23 may be as large as the pattern 21 or may be larger than the pattern 21. As shown in FIG. 7B, light including a light beam 700 emitted from the light source 3 enters the lightguide plate 2 through the incident surface 2*a*. The light propagating within the lightguide plate 2 is then reflected on one of the multiple prisms 11 arranged along the pattern 21. The light then enters the diffusion layer 23 in the protective layer 22 through the emission surface 2*c* of the lightguide plate 2 and is then diffused by the diffusion layer 23. This arrangement allows the pattern 21 to be viewable from a wider range.

In the present modification, the light propagating within the lightguide plate 2 does not enter areas in the protective layer 22 other than the diffusion layer 23, reducing glowing of flaws or dirt on the protective layer 22 as in the above embodiment.

In the present modification, the diffusion layer 23 may be formed to avoid overlapping the pattern 21 as viewed in the direction normal to the emission surface 2*c*. For example, the diffusion layer 23 may be located outside the outer periphery of the pattern 21 as indicated by a dotted line 710 in FIG. 7A. The diffusion layer 23 diffuses part of the light propagating within the lightguide plate 2 out of the lightguide plate 2, causing areas surrounding the pattern 21 to appear glowing gently as viewed from a relatively wide range. In contrast, the pattern 21 appears glowing as viewed from a relatively narrow range in a direction substantially normal to the emission surface 2*c* at the front of the emission surface 2*c*. In the modification, for the protective layer 22 with any flaw or dirt, the viewer may not easily distinguish light diffused by the flaw or dirt from light diffused by the diffusion layer 23. Thus, the flaw or dirt may be less noticeable on the protective layer 22 in the modification.

In the above described embodiment or embodiments, or modifications thereof, a protective layer (not shown) identical to the protective layer 22 may cover at least a part of the back surface 2*b* of the lightguide plate 2. In this structure, most of the light propagating within the lightguide plate 2 may be totally reflected on the back surface 2*b* of the lightguide plate 2 and does not enter the protective layer on the back surface 2*b*. This arrangement reduces glowing of flaws or dirt on the protective layer on the back surface 2*b* of the lightguide plate 2.

In another modification, a part of the protective layer 22 may have decorative printing. In the modification, a reflective layer, which may be a metal film, may be located between a layer of decorative printing (hereafter, a print layer) and the emission surface 2*c* of the lightguide plate 2 to prevent light propagating within the lightguide plate 2 from entering the print layer and then being emitted through the print layer.

In still another modification, the prisms arranged along the pattern may be located on the emission surface of the lightguide plate.

Figure 8:
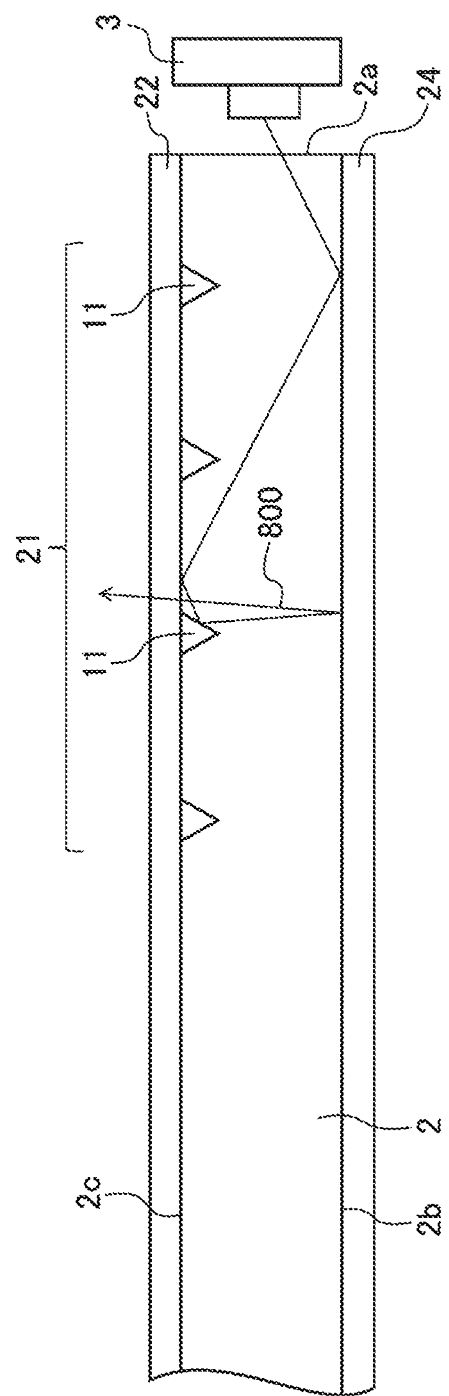
FIG. 8 is a diagram illustrating a schematic cross-sectional side view of a lightguide plate according to another modification.

FIG. 8 is a schematic cross-sectional side view of the lightguide plate according to the modification. In the present modification, the multiple prisms 11 may be arranged on the emission surface 2*c* of the lightguide plate 2 along the pattern 21 on the lightguide plate 2. A reflective layer 24, which may be a metal film, may be located to face the back surface 2*b* of the lightguide plate 2. As in the above embodiment or embodiments and modifications thereof, the protective layer 22 covers at least a part of the emission surface 2*c* of the lightguide plate 2. The reflective layer 24 and the back surface 2*b* of the lightguide plate 2 may be in close contact with each other, or may be separated from each other across an air gap. A protective layer identical to the protective layer 22 may also be located between the back surface 2*b* and the reflective layer 24.

In the modification, light including a light beam 800 emitted from the light source 3 enters the lightguide plate 2 through the incident surface 2*a*. When the light propagating within the lightguide plate 2 may be reflected on a reflective surface of one of the prisms 11, the reflected light enters the reflective layer 24 on the back surface 2*b* of the lightguide plate 2 at a smaller angle. This arrangement causes the light to be reflected again by the reflective layer 24. The light reflected on the reflective layer 24 then also enters the emission surface 2*c* at a smaller angle, and thus is emitted through the emission surface 2*c* and then through the protective layer 22 toward the viewer in the front. In the present modification, the pattern 21 appears glowing for the viewer in response to the light source 3 being turned on. In the present modification, the light propagating within the lightguide plate 2 does not enter the protective layer 22, reducing glowing of flaws or dirt on the protective layer 22. A protective layer between the back surface 2*b* of the lightguide plate 2 and the reflective layer 24, as described above, reduces glowing of flaws or dirt on the protective layer on the back surface 2*b* of the lightguide plate 2. In the present modification, a diffusion layer shaped similarly to the pattern 21 may be located in the protective layer 22 to overlap the pattern 21 as viewed in the direction normal to the emission surface 2*c*.

The display device according to any of the above embodiments and the modifications may be included in a gaming machine, such as a pachinko machine and a slot machine.

Figure 9:
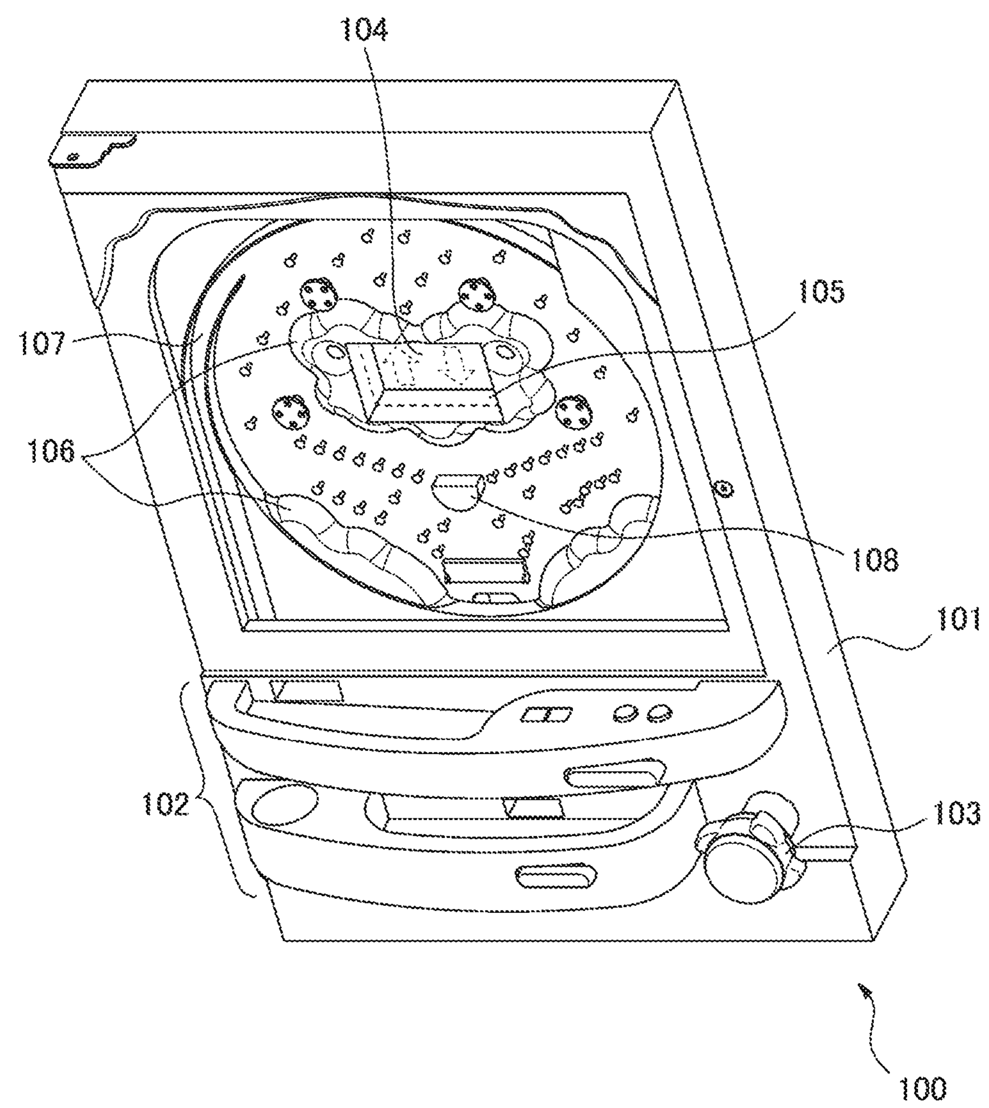
FIG. 9 is a diagram illustrating a schematic perspective view of a pachinko machine including the display device according to any of the embodiments disclosed herein and modifications thereof.

FIG. 9 is a schematic perspective view of a pachinko machine including the display device according to any of the above embodiments and modifications thereof as viewed from a player. As shown in FIG. 9, a pachinko machine 100 may include a game board 101 in most of an area from the top to the center to serve as a body of the machine, a ball tray 102 located in a lower part of the game board 101, an operating unit 103 including a handle, a liquid crystal display 104 located at substantially the center of the game board 101, and a display device 105 located on the front surface of the liquid crystal display 104.

The pachinko machine 100 further may include gimmicks 106 in a lower part of the game board 101 or around the display device 105 on the front surface of the game board 101 for entertainment effects. The game board 101 may include a rail 107 adjacent to its side. The game board 101 further may include many obstruction nails (not shown) and one or more ball pockets 108.

The operating unit 103 shoots play balls with a shooting device (not shown) under a predetermined force in accordance with the rotational amount of the handle operated by the player. The shot play balls move upward along the rail 107 and then fall between the obstruction nails. When a sensor (not shown) detects a play ball received in one of the ball pockets 108, a main control circuit (not shown) on the back of the game board 101 causes a ball ejector (not shown) to eject a predetermined number of play balls in accordance with the ball pocket 108 that has received the play ball to the ball tray 102. The main control circuit also causes an entertainment central processing unit, or CPU (not shown), on the back of the game board 101 to drive the liquid crystal display 104 and the display device 105. The entertainment CPU then transmits control signals including light control information in accordance with the play status to the display device 105.

The display device 105 is an example of the display device according to any of the above embodiments and modifications thereof and may be installed on the game board 101 to have the emission surface of the lightguide plate facing the player. The controller in the display device 105 turns on the light source in accordance with the light control information included in the control signal from the entertainment CPU to allow the player to view a pattern together with a video appearing on the liquid crystal display 104. In some embodiments, the controller may turn off all the light sources in accordance with the light control information to allow the player to view the video appearing on the liquid crystal display 104 alone through the lightguide plate. The display device 105 may reduce glowing of areas other than the pattern to be displayed, as in the above embodiments or modifications thereof.

As described above, those skilled in the art can make various changes in accordance with embodiments implemented within the scope of the invention.

The invention claimed is:

1. A display device, comprising:
- a lightguide plate comprising a transparent part, and an incident surface, the lightguide plate configured to display at least one pattern; and
- a light source facing the incident surface, wherein
- the lightguide plate further comprises:
  - a plurality of prisms directly on a surface of the lightguide plate, which are arranged along the at least one pattern, thereby forming the at least one pattern and reflect light emitted from the light source and entering the lightguide plate through the incident surface then out of the lightguide plate through an emission surface of the lightguide plate, and
  - a transparent protective layer covering at least a part of the emission surface, the protective layer having a smaller refractive index than the lightguide plate, wherein the protective layer comprises a diffusion layer which is located in a part of the protective layer, is shaped similarly to the at least one pattern and overlaps the at least one pattern as viewed in a direction normal to the emission surface, and the diffusion layer diffuses light emitted through the emission surface.

2. A gaming machine, comprising:

a body; and a display device on a surface of the body to face a player, the display device including a lightguide plate comprising a transparent part, and an incident surface, the lightguide plate being configured to display at least one pattern, and a light source facing the incident surface, wherein the lightguide plate further comprises a plurality of prisms directly on a surface of the lightguide plate, which are arranged along the at least one pattern, thereby forming the at least one pattern and reflect light emitted from the light source and entering the lightguide plate through the incident surface then out of the lightguide plate through an emission surface of the lightguide plate to face a player, and a transparent protective layer covering at least a part of the emission surface, the protective layer having a smaller refractive index than the lightguide plate, wherein the protective layer comprises a diffusion layer which is located in a part of the protective layer, is shaped similarly to the at least one pattern and overlaps the at least one pattern as viewed in a direction normal to the emission surface, and the diffusion layer diffuses light emitted through the emission surface.

* * * * *